Sept. 9, 1969 M. L. RHOTEN 3,466,473
HIGH VOLTAGE SONIC PULSE GENERATOR
Filed Dec. 30, 1966 2 Sheets-Sheet 1

INVENTOR
Merle L. Rhoten
BY
Anthony D. Cennamo
ATTORNEY

HIGH VOLTAGE SONIC PULSE GENERATOR

Filed Dec. 30, 1966 2 Sheets-Sheet 2

INVENTOR
Merle L. Rhoten
BY
Anthony D. Cennamo
ATTORNEY

United States Patent Office 3,466,473

Patented Sept. 9, 1969

3,466,473
HIGH VOLTAGE SONIC PULSE GENERATOR

Merle L. Rhoten, Columbus, Ohio, assignor to The Board of Trustees of the Ohio State University, an institution of Ohio Filed Dec. 30, 1966, Ser. No. 606,257
Int. Cl. H02n *7/00*
U.S. Cl. 310—8.7 6 Claims

ABSTRACT OF THE DISCLOSURE

This invention relates to a high voltage pulse generator utilizing a plurality of disc shaped piezoelectric crystal assemblies stacked in a column. Circuits arrangements are provided to yield a high voltage pulse or alternatively a high current pulse having a magnitude directly correlatable with the mechanical pressure applied to the assemblies.

CROSS REFERENCES AND BACKGROUND

There is disclosed in U.S. Patent No. 3,396,285, dated Aug. 6, 1968, for "Electromechanical Transducer," by H. M. Minchenko, a transducer capable of delivering extremely high power, i.e., measurable in horsepower (or kilowatts) at an acoustical frequency range. The principle underlying the high power output is in the structural arrangement of the components immediately associated with the piezoelectric driving elements. In theory and practice the piezoelectric elements are under radial and axial pressure that assure that they do not operate in tension even under intense sonic action. Significantly, the structural design of the transducer of the present invention, that permits the extraordinary power output from the driving elements, resides in the novel method of clamping the piezoelectric elements both radially and longitudinally (axially). In this way the acoustic stresses in the piezoelectric elements are always compressive, never tensile, even under maximum voltage excitation.

The transducer disclosed in the aforementioned patent application is intended, and therefore utilized, to deliver a steady state signal. That is, the piezoelectric assembly is a component of a resonant structure that will produce a mechanical vibratory output at the frequency of the driving electrical signal and vice versa. There are occasions, however, in certain applications wherein a high voltage-high energy pulse is necessary. One such application is in X-ray photography.

It is, of course, redundant to state that high voltage-high energy pulse generators are commercially available. These generators, however, are extremely large, expensive, and necessarily fixedly positioned to the installation. Even with medium or low voltage current generators the relative size to the application is extremely large.

BRIEF DESCRIPTION

The present invention is for a voltage generator capable of delivering a pulse that could be of a high voltage and/or high current or alternatively could be of extremely small voltage and current. The primary and unique principle of the invention resides in the utilization of the piezoelectric driver assembly disclosed in said copending application. The assemblies are stacked in a column with means at one end thereof to apply a physical impact. With each impact an electrical pulse is generated. The voltage of the pulse—or the current—is proportional to the pressure applied with the impact and also to the size of the piezoelectric elements in the driver assemblies.

It is accordingly a principal object of the present invention to provide a new and improved pulse generator capable of delivering a high voltage and high power pulse.

Another object of the invention is to provide such a generator that is extremely small, rugged, portable, and inexpensive.

Other objects and features of the invention will become apparent from a reading of the detailed description when taken in conjunction with the drawings in which:

DETAILED DESCRIPTION

Figure 1:
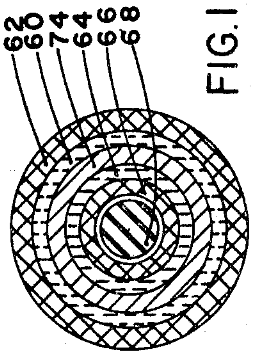
FIGURE 1 illustrates in cross-section the driver assembly utilized in the present invention.

With reference to FIGURE 1 there is shown a piezoelectric assembly described and claimed in said aforementioned application. This assembly resulted (as pointed out in that application) from tests that showed the piezoelectric rings fracture very easily when high voltages were applied; accordingly, only a very short time of full voltage operation was possible. In order to achieve a high power and continuous duty transducer the piezoelectric ring 74 and 76 has been placed under radial compression. This specific improvement was accomplished by the use of concentric rings of high temperature silicone rubber 60 and 64 encircling the piezoelectric ring 74 on its internal and external diameters. In turn the rubber rings are confined within glassfiber melamine-impregnated sleeves 62 and 66, also on their inside and outside diameters. Longitudinal compression of the rubber applies balanced radial forces both to the inside diameter and outside diameter of the piezoelectric elements. In this way, although it reduces the Q of the of the transducers, the structural arrangement has proved very successful under severe service conditions. It not only prevents the piezoelectric material (ceramic) from fracturing, but serves at the same time to reduce the possibility of flashover across the edges of the piezoelectric rings.

The silicone rubber rings 60 and 64 are contained or restrained within outer and inner melamine rings 62 and 66. The internal melamine ring 66 is a relatively long tube which is common to the several of the piezoelectric rings.

The clamping structure, described above, provides a method of exerting a controlled static stress on the piezoelectric driving element 74, in both the radial and axial directions. By this means the net dynamic stresses, developed in the piezoelectric element 74, are compressive at all times, even under intense excitation (with high voltage).

Figure 2:
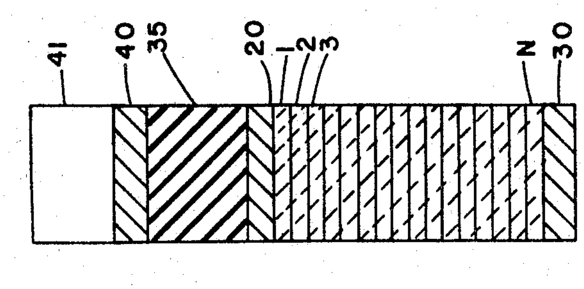
FIGURE 2 is a cross-sectional illustration of a stacked arrangement of piezoelectric assemblies as utilized in a preferred embodiment.
Figure 6:
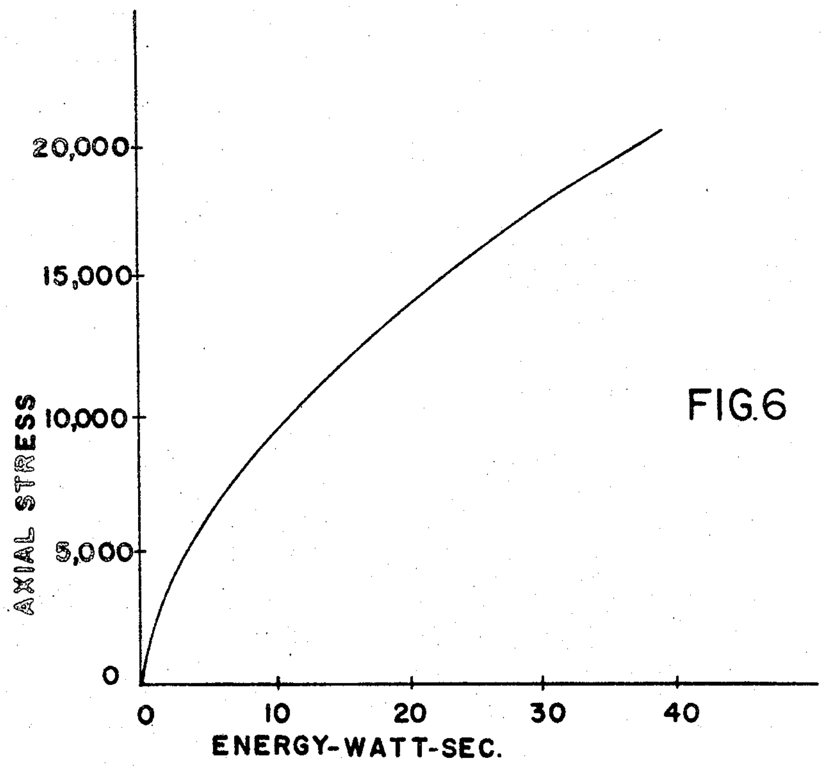

With reference to FIGURE 2 there is shown a stack of piezoelectric driver assemblies of FIGURE 1 assembled in accordance with a preferred embodiment of the present invention. Specifically, the piezoelectric elements *l* through *n* (in one preferred embodiment the stack comprised 16 assemblies) were stacked in a column. At both ends of the column there was placed a metal ring preferably brass, that made up the two electrodes. Positioned at the upper end is an insulator 35 and finally, adjacent the insulator 35 is a heavy metal disc adaptable to receiving high pressure blows. The electrodes 20 and 30, the insulator 35, and the impact ring 40 all have a diameter approximating that of the piezoelectric assemblies.

In operation of the generator of FIGURE 2 an impact is imparted to the metal disc 40. For illustration purposes the impacting means 41 is shown in block form in FIGURE 2. The impact could be simply a hammer blow or could be a pressure controlled impact. Across the electrodes 20 and 30 a utilization means is electrically connected. With each impact a voltage will be presented across the two electrodes 20 and 30, and hence to the utilization means. The insulator 35 is to preserve electrical insulation between the electrode 20 and the metal impact ring 40.

Figure 3:
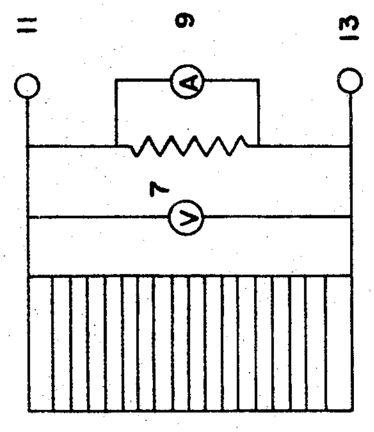
FIGURES 3 and 5 are electrical schematic circuits depicting the electrical equivalent of the preferred embodiment shown in FIGURE 2.

Referring now to FIGURE 3 there is shown schematically the electrical circuit of the preferred embodiment shown in FIGURE 2. In this instance the plurality of piezoelectric assemblies are electrically connected in series. The voltmeter 7 depicts the voltage and the ammeter 9 depicts the current appearing across the output terminals 11 and 13.

Figure 5:
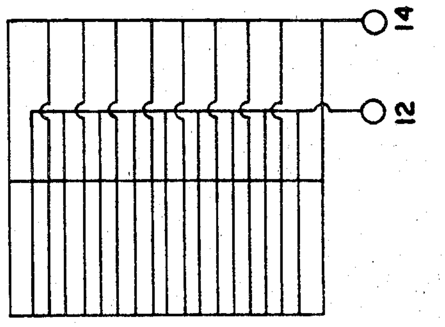

The arrangement of piezoelectric assemblies of FIGURE 5 is identical to that of FIGURE 3 except the assemblies are electrically connected in parallel.

In the electrical series stack schematically shown in FIGURE 3 the output voltage appearing across terminals is a multiple of one piezoelectric assembly times the number of assemblies in the stack. The current remains the same as the current of any one of the piezoelectric assemblies in the stack. On the other hand in the parallel arrangement schematically shown in FIGURE 5 the current is that of one piezoelectric assembly times the number of assemblies in the stack. The voltage, in this instance, remains the same as that of one assembly.

Figure 4:
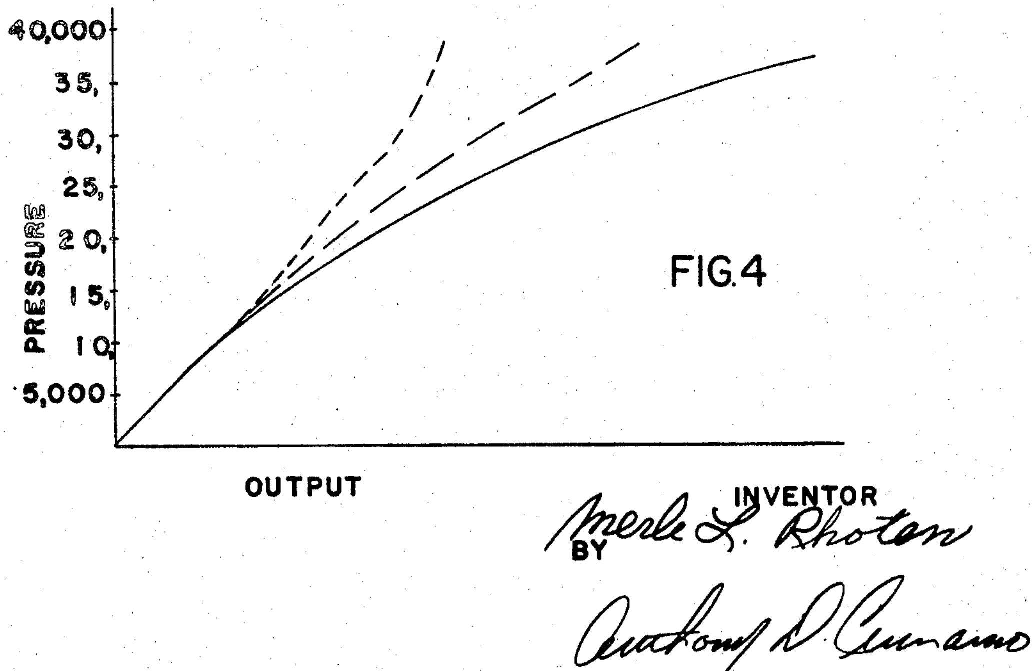
FIGURE 4 is a graphical representation of pressure vs. voltage, current and energy; and, FIGURE 6 is another graphical representation of energy output versus axial stress.

With reference to FIGURE 4 there is shown graphically the output curves for voltage, current, and energy versus the pressure of the impact imparted in p.s.i. In one preferred embodiment it was found that the voltage increases linearly with an increase of pressure up to about 7,000 p.s.i. From that point on the voltage increases exponentially with an increase in pressure; a leveling off is reached in the order of 40,000 p.s.i. The current rise with an increase is somewhat erratic and increases at a greater rate beyond the 7,000 p.s.i. point. The power rise is substantially the square of the pressure throughout the entire range. This is stated in the equation $E=\frac{1}{2}CV^2$, where E or energy is equal to C, where C is the capacitance, and the voltage squared output function is directly related to the pressure applied. Experiments have indicated that as the pressure is increased the capacitance does change to some degree but the output is effectively a square function. It may be stated, therefore, that by the novel packaging of the crystal assemblies there has been obtained very high pressures, taking advantage of the energy squared function.

In the constructed preferred embodiment shown in FIGURE 2 it was found that the voltage and current are proportional to the pressure and the thickness of the piezoelectric crystal. In one test a 1,000 lb. pressure yielded 730 volts per piezoelectric assembly; 2,000 lbs. 1,120 volts; and 3,000 lbs. 1,300 volts. In the stack of 32 piezoelectric assemblies having each a thickness of ½ inch (hence stack 16" high) a voltage of 330,000 was achieved, an output current in the order of 10,000 amperes. Taking in consideration impedance the output is expressed in terms of energy, that is, in the 32 piezoelectric assemblies the electrical output was 40 joules (or watt seconds) of electrical energy.

In an application of the preferred embodiment shown in FIGURE 2 an X-ray source was fired by the output pulse. With a single pulse success was achieved in getting a radiograph of a ½" steel plate.

It is to be expressly understood that modifications may be had to the embodiments shown without departing from the true spirit and scope of the invention.

I claim:

1. A pulse generator comprising: a plurality of piezoelectric crystal assemblies, means for aligning said assemblies, said assemblies including means for applying radial and axial pressure to said piezoelectric elements; means for applying a mechanical force in excess of 7,000 pounds per square inch to said piezoelectric crystal assemblies to drive an output pulse whose energy is a square of the pressure of said applied force as set forth in the equation $E=\frac{1}{2}CV^2$; and, means for sensing said derived output energy pulse.

2. A pulse generator as set forth in claim 1 wherein said aligning means comprises stacking said assemblies one above the other.

3. A pulse generator as set forth in claim 1 wherein said mechanical force is an impact and wherein said applying means further comprises an input plate adjacent said aligned piezoelectric crystal assemblies.

4. A pulse generator as set forth in claim 2 wherein said means for sensing said derived output energy pulse further comprises a first electrode positioned at one end of said stack and a second electrode positioned at the other end of said stack.

5. A pulse generator as set forth in claim 4 further comprising an impact plate positioned at one end of said stack and electrical insulating means separating said impact plate from one of said electrodes.

6. A pulse generator as set forth in claim 1 wherein said mechanical force is an impact and wherein the resulting electrical voltage-current is a direct function of the pressure of said impact.

References Cited

UNITED STATES PATENTS

| | | | |
|---|---|---|---|
| 3,031,591 | 4/1962 | Cary | 310—8.7 |
| 3,082,334 | 3/1963 | Riesen | 310—9.1 |
| 3,100,291 | 8/1963 | Abbott | 310—9.1 |
| 3,114,059 | 12/1963 | Hufferd | 310—9.1 |
| 3,146,360 | 8/1964 | Marshall | 310—8.7 |
| 3,217,164 | 9/1965 | Williams | 310—8.7 |
| 3,220,459 | 9/1965 | Wilson | 310—8.7 |
| 3,360,665 | 12/1967 | Boswell | 310—8.7 |
| 3,363,566 | 1/1968 | Giattino | 310—8.7 |
| 3,209,176 | 9/1965 | Paley | 310—9.1 |
| 3,060,333 | 10/1962 | Bradley | 310—8.6 |
| 3,307,053 | 2/1967 | Furth | 310—8.0 |
| 3,317,762 | 5/1967 | Corwin | 310—8.0 |
| 3,339,090 | 8/1967 | Jaffe | 310—8.7 |
| 3,396,285 | 8/1968 | Minchenko | 310—8.6 |
| 3,397,328 | 8/1968 | Schafft | 310—8.1 |
| 3,397,329 | 8/1968 | Riedel | 310—8.6 |

J. D. MILLER, Primary Examiner

U.S. Cl. X.R.

310—8.6, 9.0, 9.8